(No Model.)

C. P. RUSSELL.
HARROW.

No. 396,117. Patented Jan. 15, 1889.

Witnesses.
Frederick J. Brown
Joseph Edward Wilson

Inventor.
Chas. P. Russell
By John C. Perkins
Atty.

UNITED STATES PATENT OFFICE.

CHARLES P. RUSSELL, OF KALAMAZOO, MICHIGAN.

HARROW.

SPECIFICATION forming part of Letters Patent No. 396,117, dated January 15, 1889.

Application filed April 20, 1888. Serial No. 271,274. (No model.)

*To all whom it may concern:*

Be it known that I, CHARLES P. RUSSELL, a citizen of the United States, residing at Kalamazoo, county of Kalamazoo, State of Michigan, have invented certain new and useful Improvements in Harrows; and I declare the following to be a full, clear, and exact description, such as will enable others skilled in the art to which it appertains to make and use the same, reference being had to the accompanying drawings, forming a part of this specification.

My invention relates to that class of harrows having rectangular-shaped frames.

The object is to provide a harrow the teeth of which may be easily adjusted and securely fastened to the frame or tooth-bars. I attain these objects by the mechanism illustrated in said drawings, in which similar letters refer to similar parts throughout the several views.

Figure 1:
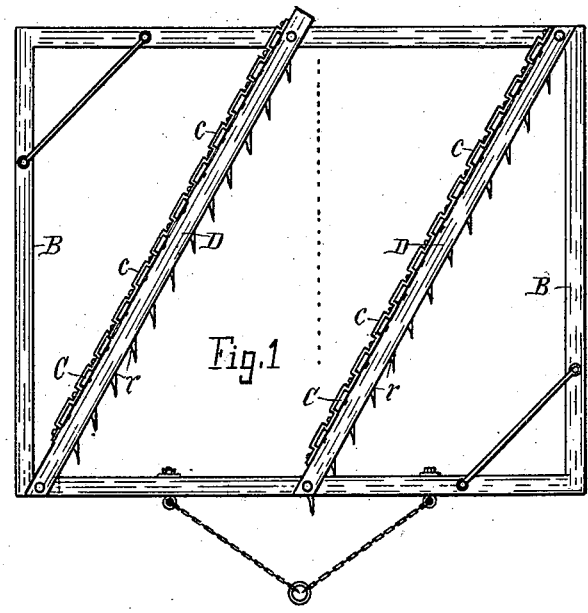
Figure 2:
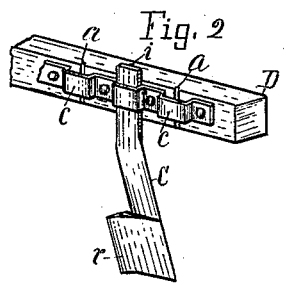
Figure 4:
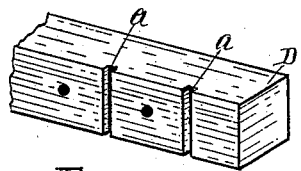
Figure 3:
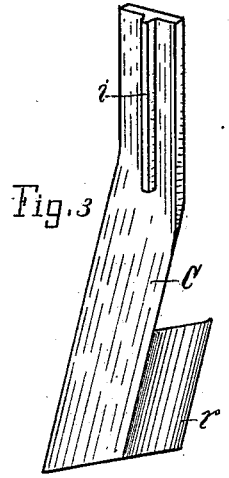
Figure 5:
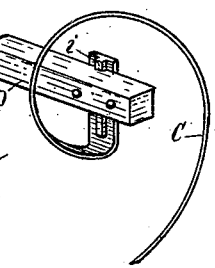

Figure 1 is a plan view of my device, showing the frame and tooth-bars. Fig. 2 is an enlarged detail, in perspective, of the tooth and its fastenings. Fig. 3 is an enlarged view of the tooth. Fig. 4 is an enlarged view of a portion of the tooth-bar. Fig. 5 is a modification showing that a curved spring-tooth may be used.

My device consists of a rectangular-shaped harrow-frame, B B, on the top of which the tooth-bars D D are securely fastened obliquely across said frame, as shown in Fig. 1, said tooth-bars having a series of mortises or grooves, $a\ a$, (shown in Figs. 2 and 4,) for receiving the projecting rib $i$ on the upper part of tooth C, (shown in Fig. 3,) thereby preventing lateral displacement of said tooth when clamped to the bar D by the continuous clip-plate $c\ c$, as shown in Fig. 2, said clip-plate being crimped to fit over the teeth and between them where they are secured to the bar D by means of bolts. (See Fig. 2.) It will be observed that the tooth has a slight twist near its center, thereby adapting said tooth to the oblique position of the bars D D and the line of draft shown by dotted line, Fig. 1. Said tooth is provided with a share, $r$, at its lower end, which consists of a diamond-shaped metal plate welded to the side of the tooth and arranged to cut the soil in the direction of the line of draft.

In adjusting the teeth loosen the bolts each side of the tooth requiring adjustment, move the tooth to the proper place, then tighten the bolts.

Having thus fully described my invention, what I claim as new, and desire to secure by Letters Patent, is—

1. In a rectangular-shaped harrow-frame, the combination of the obliquely-placed tooth-bars D D, the mortises or grooves $a\ a$ in said bars, and teeth with projecting ribs adapted to fit said mortises or grooves for preventing lateral displacement of the teeth, as shown and described.

2. In a rectangular-shaped harrow-frame, the combination of the tooth-bars D D, the mortises or grooves $a\ a$, the twisted ribbed teeth adapted to fit said grooves, and the continuous clip-plate for securing said teeth to bar D, as described and shown.

3. In a rectangular-shaped harrow-frame, the combination of the bars D D, having mortises or grooves $a\ a$, as shown, the teeth having projecting ribs adapted to fit said grooves, and the share consisting of a diamond-shaped plate secured to said tooth, as shown and described.

CHAS. P. RUSSELL.

Witnesses:
 JOSEPH EDWARD WILSON,
 CLARE WILLIAMS.